(12) United States Patent
Oh et al.

(10) Patent No.: US 11,489,223 B2
(45) Date of Patent: Nov. 1, 2022

(54) SECONDARY BATTERY

(71) Applicant: Samsung SDI Co., Ltd., Yongin-si (KR)

(72) Inventors: Dae Sik Oh, Yongin-si (KR); Hyung Noh Jung, Yongin-si (KR); Yong Seok Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 320 days.

(21) Appl. No.: 16/776,159

(22) Filed: Jan. 29, 2020

(65) Prior Publication Data

US 2020/0388799 A1 Dec. 10, 2020

(30) Foreign Application Priority Data

Jun. 10, 2019 (KR) .................. 10-2019-0067868

(51) Int. Cl.
*H01M 50/172* (2021.01)
*H01M 50/169* (2021.01)
*H01M 50/531* (2021.01)

(52) U.S. Cl.
CPC ....... *H01M 50/172* (2021.01); *H01M 50/169* (2021.01); *H01M 50/531* (2021.01)

(58) Field of Classification Search
CPC . H01M 50/172; H01M 50/531; H01M 50/169
See application file for complete search history.

(56) References Cited

U.S. PATENT DOCUMENTS

| 2,488,710 | A | 11/1949 | Cooper |
| 8,828,602 | B2 * | 9/2014 | Ahn .................. H01M 50/178 |
| | | | 429/185 |
| 9,209,432 | B2 | 12/2015 | Saimaru et al. |
| 9,583,742 | B2 | 2/2017 | Munenaga et al. |
| 10,014,498 | B2 | 7/2018 | Kim et al. |
| 10,355,252 | B2 | 7/2019 | Matsuura et al. |
| 10,770,694 | B2 | 9/2020 | Kim et al. |

(Continued)

FOREIGN PATENT DOCUMENTS

| CN | 102800888 A | 11/2012 |
| CN | 105470413 A | 4/2016 |

(Continued)

OTHER PUBLICATIONS

EPO Extended European Search Report dated Sep. 24, 2020, issued in corresponding European Patent Application No. 20165080.1 (9 pages).

(Continued)

*Primary Examiner* — Alexander Usyatinsky
(74) *Attorney, Agent, or Firm* — Lewis Roca Rothgerber Christie LLP

(57) ABSTRACT

A case for a secondary battery includes: a body plate including a bottom portion, first side portions bent and extended from the bottom portion in opposite directions, and extending portions bent from at least one selected from the bottom portion and the first side portions to then be extended; and second side portions coupled to the extending portions. A secondary battery includes an electrode assembly; the case accommodating the electrode assembly; and a cap assembly coupled to the case to seal the case.

20 Claims, 10 Drawing Sheets

(56) References Cited

U.S. PATENT DOCUMENTS

| | | | |
|---|---|---|---|
| 2009/0269657 A1* | 10/2009 | Mita | H01M 50/20 413/18 |
| 2010/0040945 A1 | 2/2010 | Wang et al. | |
| 2010/0330412 A1 | 12/2010 | Park | |
| 2011/0300423 A1* | 12/2011 | Lee | H01M 50/10 429/94 |
| 2012/0301779 A1* | 11/2012 | Munenaga | H01M 50/10 429/178 |
| 2013/0157094 A1 | 6/2013 | Saimaru et al. | |
| 2015/0243938 A1* | 8/2015 | Kim | H01M 50/148 429/185 |
| 2016/0204392 A1 | 7/2016 | Kim et al. | |
| 2016/0204396 A1 | 7/2016 | Kim et al. | |
| 2016/0361783 A1* | 12/2016 | Matsuura | H01M 50/103 |
| 2017/0047571 A1 | 2/2017 | Iwasaki et al. | |
| 2017/0133718 A1 | 5/2017 | Suzuki | |
| 2017/0237045 A1 | 8/2017 | Kim et al. | |
| 2019/0036088 A1 | 1/2019 | Wakimoto | |

FOREIGN PATENT DOCUMENTS

| | | |
|---|---|---|
| EP | 3690975 A1 | 8/2020 |
| JP | 2016-530683 A | 9/2016 |
| JP | 6050606 B2 | 12/2016 |
| JP | 2017-107773 A | 6/2017 |
| JP | 2018-29018 A | 2/2018 |
| KR | 10-2009-0089292 A | 8/2009 |
| KR | 10-1930995 B1 | 3/2019 |
| WO | WO 2012/029336 A1 | 3/2012 |
| WO | WO 2015/034173 A1 | 3/2015 |
| WO | WO 2015/166944 A1 | 11/2015 |

OTHER PUBLICATIONS

First Chinese Office Action dated May 25, 2022 of the corresponding Chinese Patent Application No. 202010355206.1, 16pp.

* cited by examiner

SECONDARY BATTERY

CROSS-REFERENCE TO RELATED APPLICATION

This application claims priority to and the benefit of Korean Patent Application No. 10-2019-0067868 filed on Jun. 10, 2019 in the Korean Intellectual Property Office, the entire contents of which are incorporated herein by reference.

BACKGROUND

1. Field

Various embodiments of the present disclosure relate to a secondary battery.

2. Description of the Related Art

A battery may be classified as a prismatic type (or kind), a cylindrical type (or kind), a pouch type (or kind), etc., according to the shape of a case of the battery. A prismatic or cylindrical battery may be manufactured by inserting an electrode assembly having a positive electrode, a negative electrode and a separator into a metal case and sealing the electrode assembly, while a pouch type (or kind) of battery may be manufactured by enclosing an electrode assembly using an aluminum foil coated with an insulator.

Existing battery case manufacturing methods may include a deep drawing process, an impact process, and so on. In an example, the deep drawing process is performed such that a sheet-shaped metal plate is placed on a molding die and punching operations are performed on the metal plate about ten times using a punch, thereby forming the case. In another example, the impact process is performed such that a slug in the form of a billet is placed on a molding die and a strong punching operation is performed on the slug about one time using a punch, thereby forming the case. The impact process can reduce the number of processing steps, thereby lowering the manufacturing cost.

However, existing drawing processes and existing impact processes are both limited in reducing a case thickness due to the respective manufacturing process characteristics and reveal a big deviation in the thickness of the case according to the area of the case. In addition, existing deep drawing processes and existing impact processes are problematic in that the manufacturing cost of the battery case is quite high.

The above information disclosed in this Background section is only for enhancement of understanding of the background of the described technology and therefore it may contain information that does not form the prior art that is already known in this country to a person of ordinary skill in the art.

SUMMARY

Embodiments of the present disclosure provides a secondary battery, which can manufacture a case having a small thickness and high accuracy while having no (or substantially no) thickness deviation, and which can prevent a welding failure from occurring to a region where three or more faces are coupled to one another (or can reduce a likelihood or degree of such welding failure) by welding second side portions provided as separate metal plates to a body plate on a plane.

According to an aspect of embodiments of the present disclosure, there is provided a secondary battery including an electrode assembly; a case accommodating the electrode assembly; and a cap assembly coupled to the case to seal the case, wherein the case includes: a body plate including a bottom portion, first side portions bent and extended from the bottom portion in opposite directions, and extending portions bent from at least one selected from the bottom portion and the first side portions to then be extended; and second side portions coupled to the extending portions.

The extending portions may include a first extending portion bent and extended from the bottom portion, and a second extending portion bent and extended from the first side portions.

The body plate may further include round portions having a set or predetermined curvature radius between the bottom portion and the first extending portion and between the first side portions and the second extending portion.

An extended length of the first extending portion or the second extending portion may be either at least equal to or not greater than 2.5 times the curvature radius of each of the round portions.

The body plate may further include rounded bent portions between the bottom portion and the first side portion.

The body plate may further include rounded corner portions, where the bottom portion, the first side portions, the first extending portion and the second extending portion are joined with one another.

The second side portions made of sheet-shaped metal plates may be coupled to the first and second extending portions of the body plate in a state in which their edge portions are lapped with the first and second extending portions.

The second side portion may be outwardly protruded from the case relative to the first and second extending portions in a first direction, which is an exterior direction of the case.

The second side portion made of a sheet-shaped metal plate may be coupled to the body plate in a state in which its peripheral edge is brought into contact with the peripheral edges of the first and second extending portions of the body plate.

The second side portion may be positioned to be coplanar with the first and second extending portions in a second direction.

The second side portion and the first extending portion, and the second side portion and the second extending portion, may be coupled to one another by lap-joint welding or butt-joint welding.

According to embodiments of the disclosure, a case for accommodating a secondary battery includes: a body plate including a bottom portion, first side portions bent and extended from the bottom portion in opposite directions, and extending portions bent from at least one selected from the bottom portion and the first side portions to then be extended; and second side portions coupled to the extending portions.

The extending portions may include a first extending portion bent and extended from the bottom portion, and a second extending portion bent and extended from the first side portions.

The body plate may further include round portions having a set curvature radius between the bottom portion and the first extending portion and between the first side portions and the second extending portion.

An extended length of the first extending portion or the second extending portion is either at least equal to or not greater than 2.5 times the curvature radius of each of the round portions.

The body plate may further include rounded bent portions between the bottom portion and the first side portion.

The body plate may further include rounded corner portions, where the bottom portion, the first side portions, the first extending portion and the second extending portion are joined with one another.

The second side portions made of sheet-shaped metal plates may be coupled to the first and second extending portions of the body plate in a state in which their edge portions are lapped with the first and second extending portions.

The second side portion may be outwardly protruded from the case relative to the first and second extending portions in a first direction, which is an exterior direction of the case.

The second side portion made of a sheet-shaped metal plate may be coupled to the body plate in a state in which its peripheral edge is brought into contact with the peripheral edges of the first and second extending portions of the body plate.

As described above, according to embodiments of the present disclosure, because rounded corner portions, where four faces are joined with one another, are press-fitted, a welding failure, which may occur when multiple are joined with one another by welding, can be prevented (or a likelihood or degree of such welding failure can be reduced).

In more detail, according to embodiments of the present disclosure, because the case is manufactured by press-fitting only regions where the corner portions are located, there is no thickness deviation in the case, and the case having a small thickness may be manufactured with high accuracy. In addition, because the second side portions provided as separate metal plates are welded to a body plate on a plane, a welding failure, which may occur when welding is performed on a curved portion or a region where three or more faces are joined with one another, can be prevented (or a likelihood or degree of such welding failure can be reduced).

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
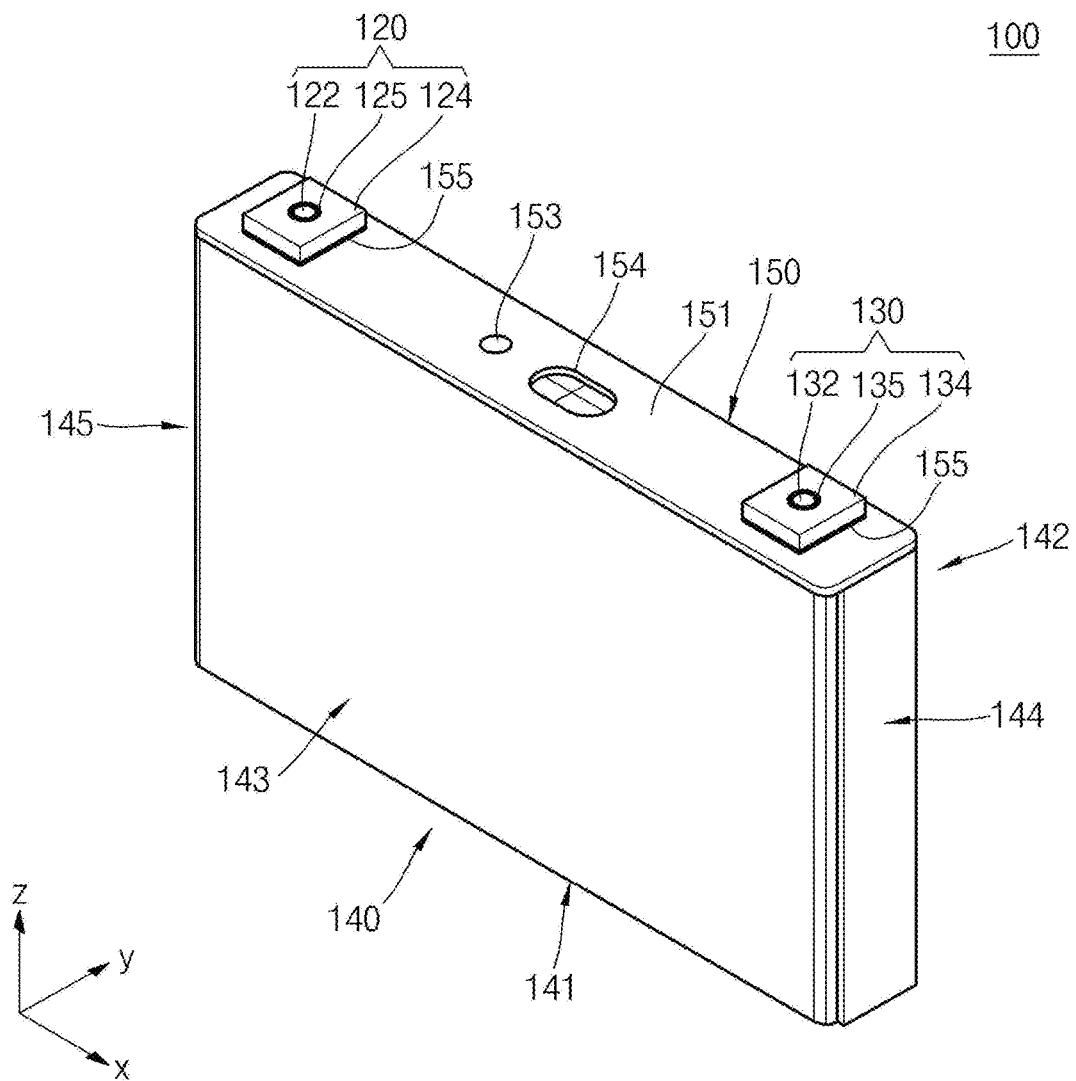
FIG. 1 is a perspective view illustrating an example secondary battery according to an embodiment of the present disclosure.

Hereinafter, an embodiment of the present disclosure will be described in more detail. The subject matter of the present disclosure may be embodied in many different forms and should not be construed as being limited to the example embodiments set forth herein. Rather, these example embodiments of the disclosure are provided so that this disclosure will be thorough and complete and will convey the subject matter of the disclosure to those skilled in the art.

In addition, in the accompanying drawings, sizes or thicknesses of various components may be exaggerated for brevity and clarity. Like numbers refer to like elements throughout. In addition, it will be understood that when an element A is referred to as being "coupled to" an element B, the element A can be directly coupled to the element B or an intervening element C may be present and the element A and the element B are indirectly coupled to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

The term "welding portion," as used herein, can be referred to as a temporary welding portion and/or a welding portion in some cases, which is for representing the welding sequence and function but is not intended to limit the present disclosure. In addition, the term "welding," as used herein, mainly means laser welding, and examples of lasers used for such welding may include, but not limited to, $CO_2$ lasers, fiber lasers, disk lasers, semiconductor lasers and/or YAG (Yttrium Aluminum Garnet) lasers. In addition, the terms "second short side portion" and "third short side portion," as used herein, can be referred to as second short side portions, in some cases.

FIG. 1 is a perspective view illustrating an example secondary battery 100 according to an embodiment of the present disclosure. In the example shown in FIG. 1, the secondary battery 100 may include an electrode assembly 110, a first terminal 120, a second terminal 130, a case 140 (e.g., a can) and a cap assembly 150.

In some examples, the case 140 may be provided by blanking and/or notching, bending and welding a metal plate and may have a substantially hexahedral shape having an opening through which the electrode assembly 110 is inserted and placed and the cap assembly 150 is mounted. In some examples, the case 140 may include a rectangular bottom portion 141 having long sides and short sides, first side portions 142 and 143 bent and extended from the respective long sides of the rectangular bottom portion 141 to the cap assembly 150, and second side portions 144 and 145 welded to the respective short sides of the rectangular bottom portion 141 and ends of the first side portions 142 and 143. In addition, the first side portions 142 and 143 may be surfaces that are bent and extended from the short sides. Here, the second side portions 144 and 145 may be welded to the ends of the first side portions 142 and 143, which are long and short sides of the rectangular bottom portion 141. For example, if the first side portions 142 and 143 are long side portions, the second side portions 144 and 145 may be short side portions. Conversely, if the first side portions 142 and 143 are short side portions, the second side portions 144 and 145 may be long side portions. The following description will be given in a case where the first side portions 142 and 143 are long side portions and the second side portions 144 and 145 are short side portions, but the present disclosure is not limited thereto.

In FIG. 1, the case 140 and the cap assembly 150 assembled to each other are illustrated, so that the opening, which is a substantially opened part of a region corresponding to the cap assembly 150, is covered by the cap assembly 150. In some embodiments, the interior surface of the case 140 is subjected to insulation treatment such that the case 140 is insulated (e.g., electrically insulated) from the electrode assembly, the first terminal 120, the second terminal 130 and the cap assembly 150.

Figure 2A:
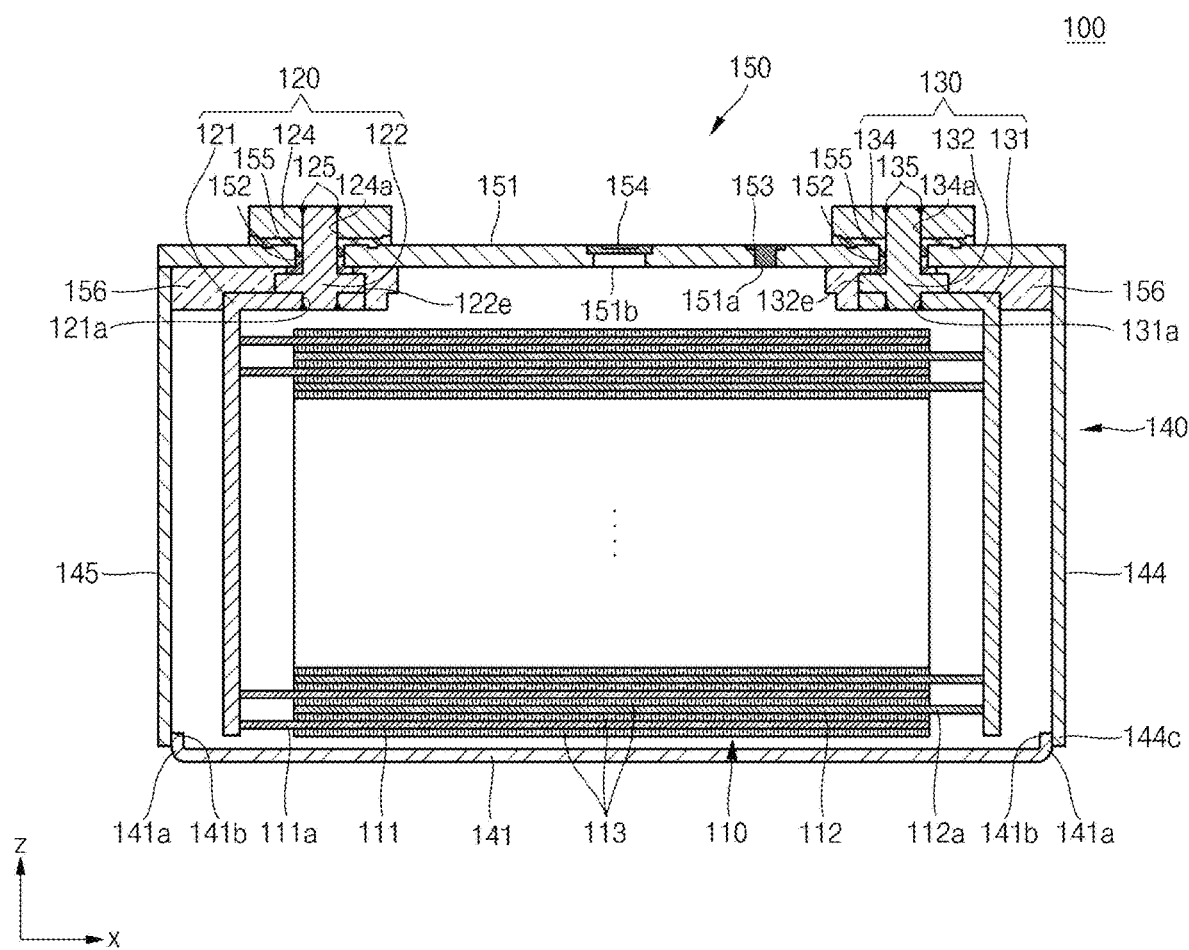
FIGS. 2A and 2B are cross-sectional views illustrating the example secondary battery shown in FIG. 1.
Figure 2B:
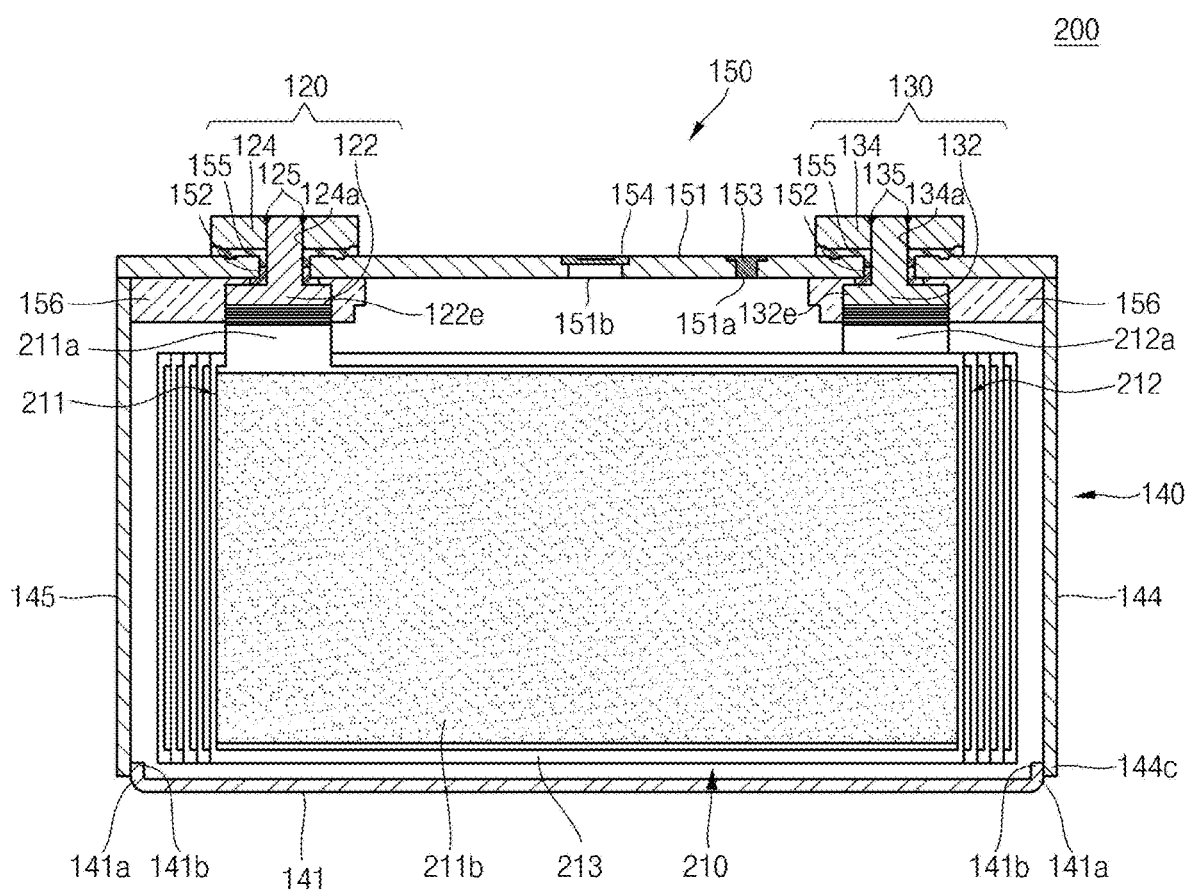

FIGS. 2A and 2B are cross-sectional views illustrating example secondary battery 100 and secondary battery 200, respectively. In the example shown in FIG. 2A, the secondary battery 100 may include an electrode assembly 110 having a winding axis extending in a horizontal direction (e.g., in a direction substantially parallel with a lengthwise direction of the cap assembly 150). In the example shown in FIG. 2B, the secondary battery 200 may include an electrode assembly 210 having a winding axis extending in a vertical direction (e.g., in a direction substantially perpendicular to the lengthwise direction of the cap assembly 150). In some examples, the electrode assembly may be a stacked electrode assembly, not a wound electrode assembly.

The secondary battery 100 shown in FIG. 2A will now be described. The electrode assembly 110 may be formed by winding or stacking a stacked structure including a first electrode plate 111, a separator 113, and a second electrode plate 112, which are thin plates or layers. In some examples, the first electrode plate 111 may operate as a negative electrode and the second electrode plate 112 may operate as a positive electrode, and vice versa.

In some examples, the first electrode plate 111 may be formed by coating a first active material, such as graphite and/or carbon, on a first electrode collector made of a metal foil, such as copper, a copper alloy, nickel and/or a nickel alloy, and may include a first uncoated portion 111a that is not coated with the first active material. In some examples, the second electrode plate 112 may be formed by coating a second active material, such as a transition metal oxide, on a second electrode collector made of a metal foil, such as, for example, aluminum and/or an aluminum alloy, and may include a second uncoated portion 112a that is not coated with the second electrode material. In some examples, the separator 113, which is located between the first electrode plate 111 and the second electrode plate 112, may prevent short circuits between the first electrode plate 111 and the second electrode plate 112 (or may reduce a likelihood or degree of such short circuits), and may allow lithium ions to move. In addition, the separator 113 may include polyethylene, polypropylene, and/or a composite film of polyethylene and polypropylene. In addition, the separator 113 may be replaced by an inorganic solid electrolyte, such as a sulfide-based compound, an oxide-based compound, and/or a sulfate compound, thereby not necessitating a liquid- or gel-phase electrolyte solution.

The first terminal 120 and the second terminal 130 electrically coupled to the first electrode plate 111 and the second electrode plate 112, respectively, are located at opposite ends of the electrode assembly 110. In some examples, the electrode assembly 110 can be accommodated in the case 140 with an electrolytic solution. In some examples, the electrolytic solution may include an organic solvent, such as ethylene carbonate (EC), propylene carbonate (PC), diethyl carbonate (DEC), ethyl methyl carbonate (EMC), and/or dimethyl carbonate (DMC), and a lithium salt, such as $LiPF_6$ and/or $LiBF_4$. In some examples, if the inorganic solid electrolyte is used, the electrolytic solution may be omitted.

The first terminal 120 may be made of a metal and may be electrically coupled to the first electrode plate 111. In some examples, the first terminal 120 may include a first collector plate 121, a first terminal pillar 122 and a first terminal plate 124. In some examples, the first collector plate 121 may be brought into contact with the first uncoated portion 111a protruding to one end of the electrode assembly 110. In some embodiments, the first collector plate 121 may be welded to the first uncoated portion 111a. In some examples, the first collector plate 121 may be roughly in an inverted L-shaped ("]") configuration and may have a first terminal hole 121a located in its top portion. In some examples, the first terminal pillar 122 may be inserted into the first terminal hole 121a, followed by riveting and/or welding. In some examples, the first collector plate 121 may be made of copper and/or a copper alloy.

In some examples, the first terminal pillar 122 penetrates the cap plate 151 to be described further herein below and is electrically coupled to the first collector plate 121 under the cap plate 151. In addition, in some examples, while the first terminal pillar 122 is upwardly protruded and extended to an upper portion of the cap plate 151 by a set or predetermined length, a planar flange 122e may be located below the cap plate 151 to prevent the first terminal pillar 122 from being dislodged from the cap plate 151 (or to reduce a likelihood or degree of such dislodging). A portion of the first terminal pillar 122 positioned below the planar flange 122e is fitted into the first terminal hole 121a of the first collector plate 121, followed by riveting and/or welding. In some examples, the first terminal pillar 122 may be electrically insulated from the cap plate 151. In some examples, the first terminal pillar 122 may be made of copper, a copper alloy, aluminum and/or an aluminum alloy.

The first terminal plate 124 has a hole 124a, to which the first terminal pillar 122 is coupled to and riveted and/or welded. In some examples, boundary regions of the upwardly exposed first terminal pillar 122 and the first terminal plate 124 may be welded to each other. For example, a laser beam may be supplied to the boundary regions of the upwardly exposed first terminal pillar 122 and the first terminal plate 124 to melt the boundary regions, followed by cooling, thereby welding the boundary regions. The welded regions are designated by reference number 125 in FIGS. 1 and 2A. Meanwhile, a bus bar made of aluminum and/or an aluminum alloy may be welded to the first terminal plate 124.

The second terminal 130 may also be made of a metal and may be electrically coupled to the second electrode plate 112. In some examples, the second terminal 130 may include a second collector plate 131, a second terminal pillar 132 and a second terminal plate 134. In some examples, the second collector plate 131 may be brought into contact with the second uncoated portion 112a protruding to one end of the electrode assembly 110. In some examples, the second collector plate 131 may be roughly in an inverted L-shaped ("]") configuration and may have a second terminal hole 131a located in its top portion. In some examples, the second terminal pillar 132 may be inserted into the second terminal hole 131a and then coupled thereto. In some examples, the first collector plate 121 may be made of, for example, but not limited to, aluminum and/or an aluminum alloy.

In some examples, the second terminal pillar 132 penetrates the cap plate 151 to be described further herein below and is electrically coupled to the second collector plate 131 under the cap plate 151. While the second terminal pillar 132 is upwardly protruded and extended to an upper portion of the cap plate 151 by a set or predetermined length, a planar flange 132e may be located below the cap plate 151 to prevent the second terminal pillar 132 from being dislodged from the cap plate 151 (or to reduce a likelihood or degree of such dislodging). A portion of the second terminal pillar 132 positioned below the planar flange 132e is fitted into the second terminal hole 131a of the second collector plate 131, followed by riveting and/or welding. Here, the second terminal pillar 132 may be electrically insulated from the cap plate 151. In some examples, the second terminal pillar 132 may be made of aluminum and/or an aluminum alloy.

The second terminal plate 134 has a hole 134a. In addition, the second terminal pillar 132 may be coupled to the hole 134a of the second terminal plate 134 to then be riveted and/or welded. In some examples, boundary regions of the upwardly exposed second terminal pillar 132 and the second terminal plate 134 may be welded to each other. For example, a laser beam may be supplied to the boundary regions of the upwardly exposed second terminal pillar 132 and the second terminal plate 134 to melt the boundary regions, followed by cooling, thereby welding the boundary regions. The welded regions are designated by reference number 135 in FIGS. 1 and 2A. A bus bar made of aluminum and/or an aluminum alloy may be easily welded to the second terminal plate 134. Here, the second terminal plate 134 may be electrically coupled to the cap plate 151. Thus, the cap plate 151 and the case 140, which will be described further herein below, may have the same polarity as the second terminal 130 (e.g., a positive polarity).

The cap assembly 150 may be coupled to the case 140. In some examples, the cap assembly 150 may include the cap plate 151, a seal gasket 152, a plug 153, a safety vent 154, an upper coupling member 155 and a lower insulating member 156. The cap plate 151 may seal the opening of the case 140, and may be made of the same (e.g., substantially the same) material as the case 140. In some examples, the cap plate 151 may be coupled to the case 140 by laser welding. Here, because the cap plate 151 has the same polarity as the second terminal 130, the cap plate 151 and the case 140 may have the same polarity. The seal gasket 152 made of an insulating material may be located between each of the first terminal pillar 122 and the second terminal pillar 132 and the cap plate 151 at a bottom end of the cap plate 151 and may seal regions between each of the first terminal pillar 122 and the second terminal pillar 132 and the cap plate 151. The seal gasket 152 may prevent or reduce the permeation of external moisture into the secondary battery 100 or prevent or reduce the effusion of the electrolyte accommodated in the secondary battery 100 to the outside. The plug 153 may seal an electrolyte injection hole 151a of the cap plate 151. The safety vent 154 may be installed in a vent hole 151b of the cap plate 151 and has a notch configured to be openable at a preset pressure. The upper coupling member 155 may be located between each of the first terminal pillar 122 and the second terminal pillar 132 and the cap plate 151 at a top end of the cap plate 151. In addition, the upper coupling member 155 may closely contact (e.g., directly or physically contact) the cap plate 151. In addition, the upper coupling member 155 may also closely contact (e.g., directly or physically contact) and the seal gasket 152. The upper coupling member 155 may insulate (e.g., electrically insulate) the first terminal pillar 122 and the second terminal pillar 132 from the cap plate 151. In some examples, the upper coupling member 155 located in the second terminal pillar 132 may electrically couple the second terminal plate 134 and the cap plate 151 to each other. Accordingly, the second terminal 130 may have the same polarity as the cap plate 151 and the case 140. The lower insulating member 156 may be located between each of the first collector plate 121 and the second collector plate 131 and the cap plate 151 and may prevent an unnecessary short circuit from being generated (or may reduce a likelihood or degree of such short circuit). For example, the lower insulating member 156 may prevent short circuits from being generated between the first collector plate 121 and the cap plate 151 and between the second collector plate 131 and the cap plate 151 (or may reduce a likelihood or degree of such short circuits).

The secondary battery 200 shown in FIG. 2B will now be described. The secondary battery 200 is different from the secondary battery 100 in terms of the construction of the electrode assembly 210 and the connection relationships between the electrode assembly 210 and each of the first terminal 120 and the second terminal 130. A first electrode tab 211a may be positioned between the electrode assembly 210 and a first terminal pillar 122 of a first terminal 120, and a second electrode tab 212a may be positioned between the electrode assembly 210 and a second terminal pillar 132 of a second terminal 130. For example, the first electrode tab 211a may be extended from a top end of the electrode assembly 210 to a bottom end of the first terminal pillar 122 of the first terminal 120 to then be electrically coupled or welded to a planar flange 122e provided in the first terminal pillar 122. In some embodiments, the second electrode tab 212a may be extended from a top end of the electrode assembly 210 to a bottom end of the second terminal pillar 132 of the second terminal 130 to then be electrically coupled or welded to a planar flange 132e provided in the second terminal pillar 132. In some embodiments, the first electrode tab 211a may be either a first uncoated portion of the first electrode plate 211 of the electrode assembly 210, which is not coated with a first active material 211b, or a separate member coupled to the first uncoated portion. Here, the first uncoated portion may be made of the same (e.g., substantially the same) material as the first electrode plate 211, and the separate member may be one selected from the group consisting of nickel, a nickel alloy, copper, a copper alloy, aluminum, an aluminum alloy, and equivalents thereof. In addition, in some embodiments, the second electrode tab 212a may be either a second uncoated portion of the second electrode plate 212 of the electrode assembly 210, which is not coated with a second active material, or a separate member coupled to the second uncoated portion. Here, the second uncoated portion may be made of the same (e.g., substantially the same) material as the second electrode plate 212, and the separate member may be one selected from the group consisting of aluminum, an aluminum alloy nickel, a nickel alloy, copper, a copper alloy, and equivalents thereof.

As described herein above, because a winding axis of the electrode assembly 210 and terminal axes of the first terminal 120 and the second terminal 130 are parallel or horizontal with each other, the electrode assembly 210 has excellent electrolyte impregnation capability when an electrolyte is injected, and internal gases are rapidly transferred to a safety vent 154 during overcharging to make the safety vent 154 quickly operate. In addition, electrode tabs (uncoated portions or separate members) of the electrode assembly 210 are directly electrically coupled to the first terminal 120 and the second terminal 130, which shortens electrical paths, thereby reducing internal resistance of the secondary battery 100 while reducing the number of components of the secondary battery 100.

In some embodiments, the case 140 manufactured by the example method to be described further herein below can be employed to the secondary battery 100 and the secondary battery 200 as shown in FIGS. 1, 2A and 2B.

Figure 3A:
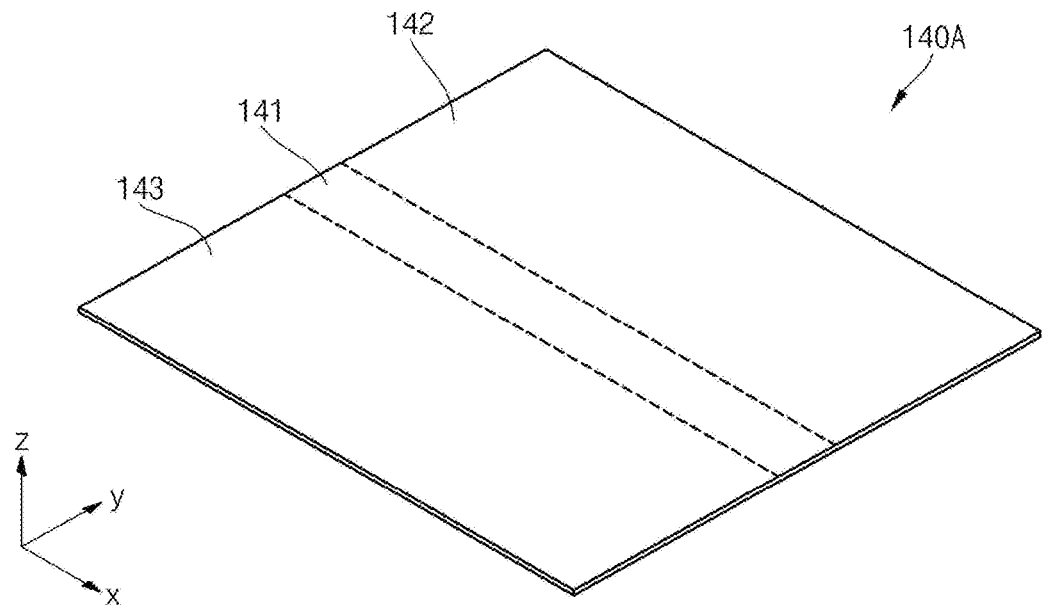
FIGS. 3A to 3D are perspective views illustrating an example method for manufacturing the example secondary battery shown in FIG. 1.
Figure 3B:
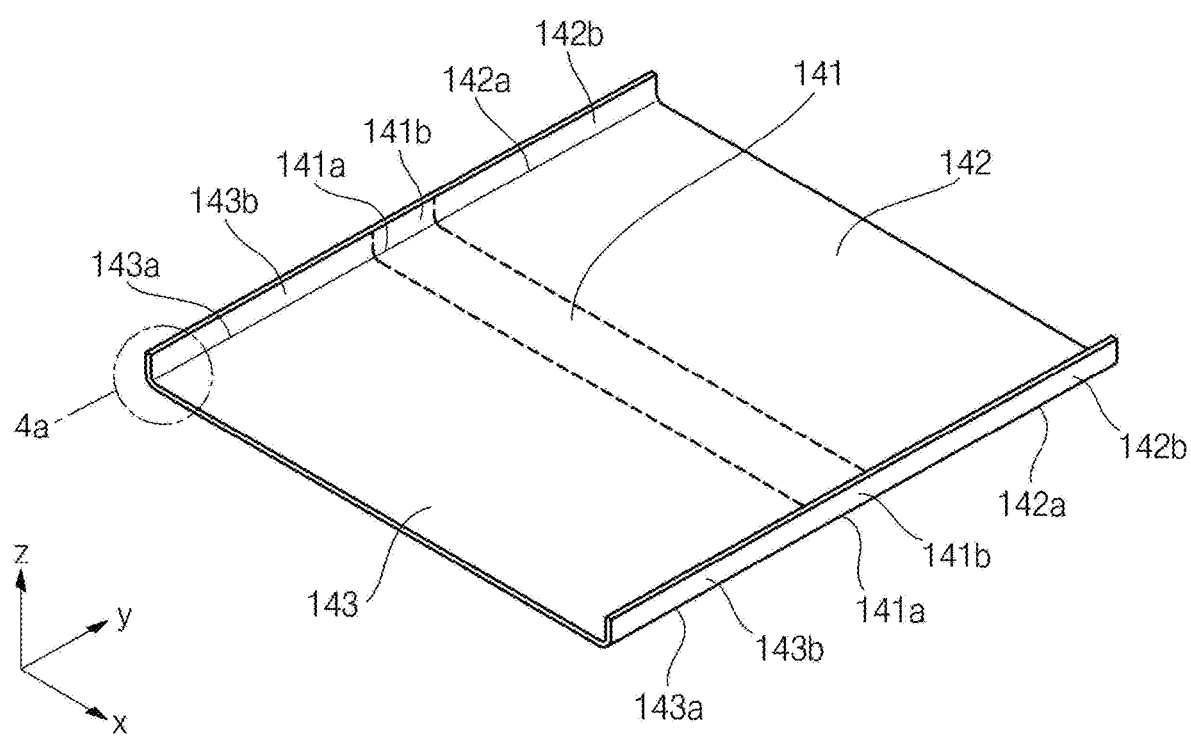
Figure 3C:
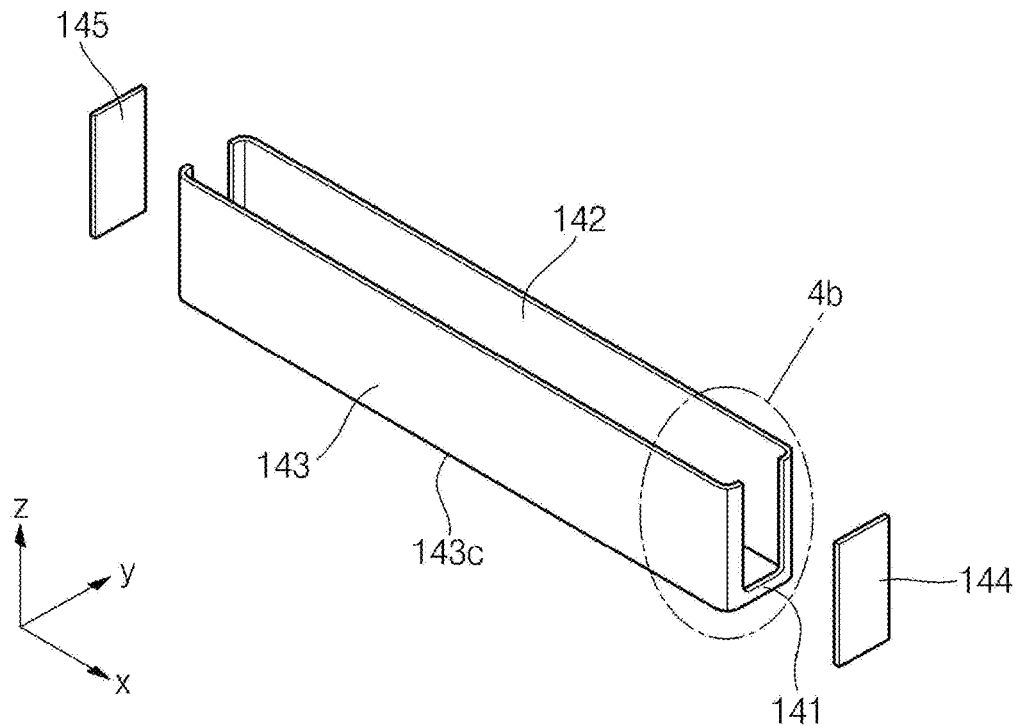

FIGS. 3A to 3D are perspective views illustrating an example method for manufacturing the example secondary battery shown in FIG. 1. FIG. 4A is a partially enlarged view illustrating a portion 4a shown in FIG. 3B, FIG. 4B is a partially enlarged view illustrating a portion 4b shown in FIG. 3C, and FIG. 4C is a cross-sectional top view taken along the line 4c-4c of FIG. 3D.

Hereinafter, a method for manufacturing a case 140 will be described with reference to FIGS. 3A to 3D and FIGS. 4A to 4C.

FIG. 3A shows a case at an initial stage of manufacture.

In the example shown in FIG. 3A, a substantially planar metal plate having a uniform (e.g., substantially uniform) thickness may be provided. In some examples, the metal plate may include aluminum (Al), iron (Fe), copper (Cu), titanium (Ti), nickel (Ni), magnesium (Mg), chrome (Cr), manganese (Mn), zinc (Zn), and/or alloys of these elements. In some examples, the metal plate may include nickel (Ni) plated iron (Fe) and/or SUS (e.g., SUS 301, SUS 304, SUS 305, SUS 316L, and/or SUS 321).

In addition, in some examples, the metal plate may have a thickness in the range from approximately 0.1 mm to approximately 10 mm, and a deviation in the thickness of the metal plate in all areas may be in the range from approximately 0.1% to approximately 1%. Therefore, embodiments of the present disclosure provide the case 140 that is relatively thin and has a small thickness deviation, as compared to an existing case.

In addition, in some examples, the metal plate may be preprocessed to facilitate a bending process and/or a welding process, which will be described further herein below. In some examples, the metal plate may be subjected to annealing treatment performed in a set or predetermined gas atmosphere and a set or predetermined temperature range for a set or predetermined period of time. In some examples, the annealing treatment may be performed in an atmosphere of inert gas, such as argon (Ar) and/or nitrogen ($N_2$) at a temperature ranging from approximately 300° C. to approximately 1000° C. for approximately 10 seconds to approximately 60 minutes. The annealing treatment may increase the elongate of the metal plate by approximately 5% to approximately 60%. Accordingly, the bending process of the metal plate, which will be further described herein below, may be easily performed, and occurrence of a spring-back phenomenon can be minimized or reduced, for example, after the bending process.

In addition, the metal plate may have a substantially planar top surface and a substantially planar bottom surface. The top surface of the metal plate may be subjected to insulation treatment (e.g., electrical insulation treatment). In some examples, a thin insulation film may be located on the top surface of metal plate by forming a thin oxide layer (e.g., an anodizing layer) through a metal oxidation process or coating or laminating an insulation resin (e.g., polyimide, polypropylene, and/or polyethylene). In some examples, the top surface of the metal plate may correspond to the interior surface of the case 140, and the bottom surface of the metal plate may correspond to the exterior surface of the case 140. These features of the metal plate can be applied to all metal plates disclosed in the following embodiments.

In addition, the substantially planar metal plate having a uniform (e.g., substantially uniform) thickness may be separated into a planar body plate 140A having a set or predetermined size through a blanking process. In some examples, the planar body plate 140A may include a substantially rectangular bottom portion 141 having long sides and short sides, first side portions 142 and 143 (to be bent from the bottom portion later) horizontally extending from the respective long sides of the rectangular bottom portion 141.

In addition, in the following description, the same direction as a direction in which the long sides of the rectangular bottom portion 141 are extended will be referred to a first direction (x) that is a width direction, and the same direction as a direction in which the short sides of the rectangular bottom portion 141 are extended, which is a direction perpendicular (e.g., substantially perpendicular) to the first direction (x), will be referred to a second direction (y) that is a length direction. In addition, a first direction (x) width of the first side portions 142 and 143 may be substantially equal to a width of the long side of the rectangular bottom portion 141. In FIG. 3A, dotted lines indicate bending lines in a subsequent process to be further described herein below.

FIGS. 3B and 4A show the case 140 at later stages of manufacture.

In the example shown in FIG. 3B, opposite ends of the first direction (x) of the planar body plate 140A are bent approximately 90 degrees in a third direction (z) that is a height direction, thereby processing round portions 141a, 142a, and 143a. Here, the short sides of the rectangular bottom portion 141 or sides of the first side portions 142 and 143 may be located at the opposite ends of the first direction (x) of the planar body plate 140A. In some embodiments, some interior regions of the short sides of the rectangular bottom portion 141 and the sides of the first side portions 142 and 143 may be bent in the third direction (z), thereby providing the round portions 141a, 142a, and 143a having a set or predetermined curvature radius (e.g., radius of curvature). The round portions 141a, 142a, and 143a may be provided by bending the opposite ends of the first direction (x) of the planar body plate 140A in a set or predetermined shape after the planar body plate 140A is fixed in a bending machine and/or a press mold.

The round portions 141a, 142a, and 143a may be spaced a set or predetermined distance apart from the short sides of the rectangular bottom portion 141 and the sides of the first side portions 142 and 143. For example, extending portions 141b, 142b, and 143b that are extended by a set or predetermined length may further be provided between the round portions 141a, 142a, and 143a and the short sides of the rectangular bottom portion 141 and between the round portions 141a, 142a, and 143a and the sides of the first side portions 142 and 143. The round portions 141a, 142a, and 143a may be portions press-fitted and rounded when the extending portions 141b, 142b, and 143b corresponding to ends of the planar body plate 140A are bent in the third direction (z).

Figure 4A:
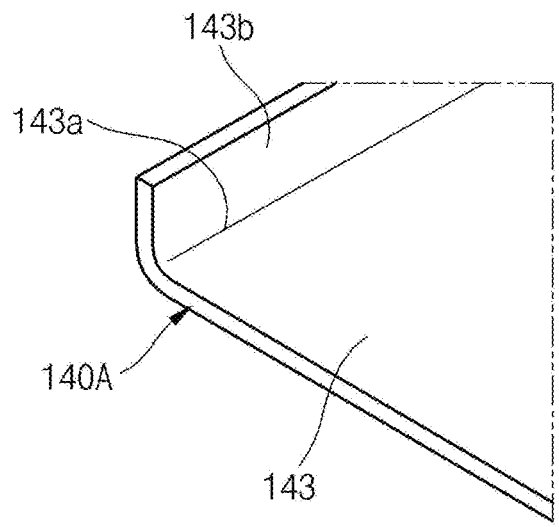
FIGS. 4A to 4C are partially enlarged views and a cross-sectional top view illustrating the example secondary battery shown in FIGS. 3A to 3D.
Figure 4B:
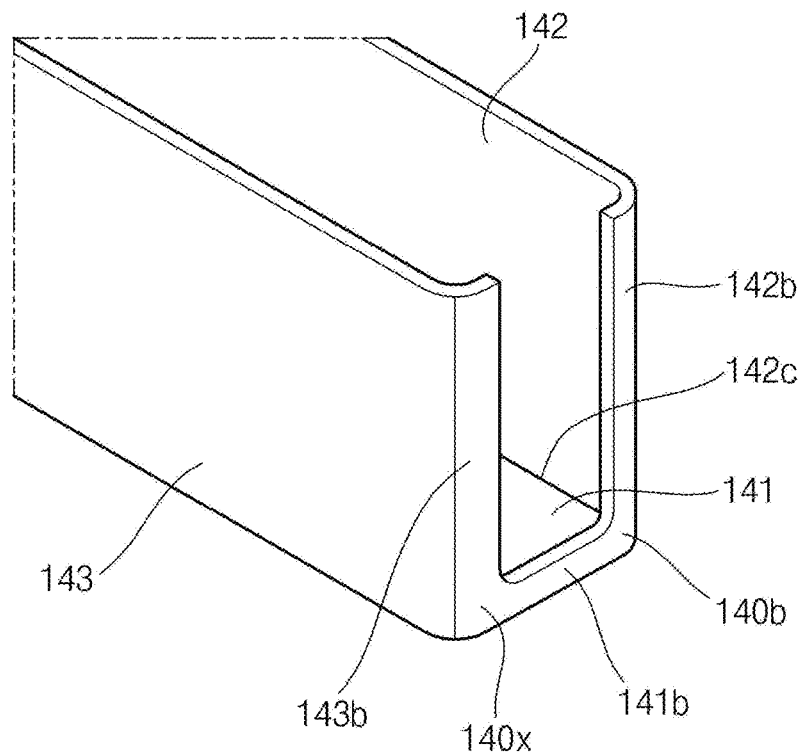
Figure 5A:
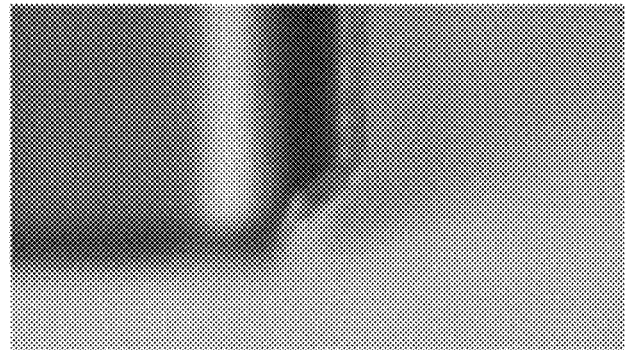
FIGS. 5A to 5C show photographs for comparing example round portions depending on the lengths of extending portions.
Figure 5B:
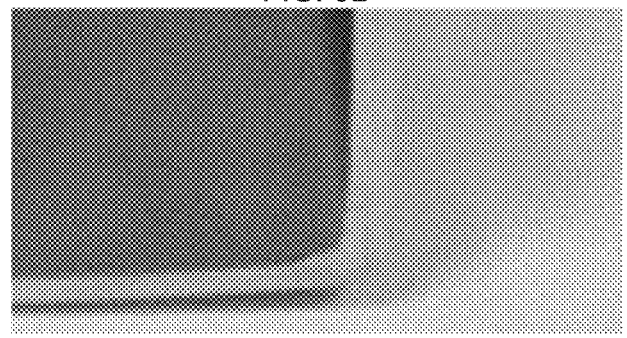
Figure 5C:
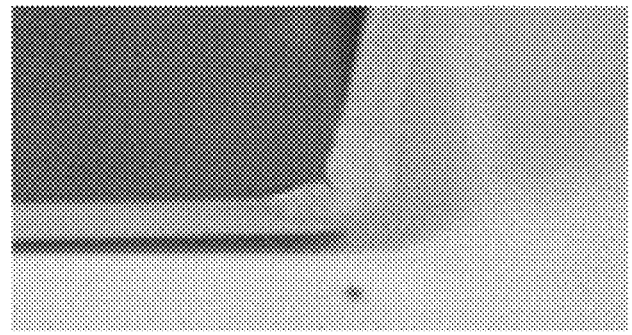

Here, the extending portions 141b, 142b, and 143b may be portions vertically bent from the rectangular bottom portion 141 and the first side portions 142 and 143 and extended in the third direction (z) by a set or predetermined length. The extended length of the extending portions 141b, 142b, and 143b may be either at least equal to or not greater than 2.5 times the curvature radius of each of the round portions 141a, 142a, and 143a. Here, if the length of each of the extending portions 141b, 142b, and 143b is less than the curvature radius, as shown in FIG. 5A, the round portions 141a, 142a, and 143a may not be properly formed. If the length of each of the extending portions 141b, 142b, and 143b is greater than 2.5 times the curvature radius, as shown in FIGS. 5B and 5C, corner portions 140x and 140b (identified in FIG. 4B), where the first side portions 142 and 143, the extending portions 141b, 142b, and 143b and the rectangular bottom portion 141 are joined with one another, may be crumpled or broken when the first side portions 142 and 143 are bent from the rectangular bottom portion 141.

FIGS. 3C and 4B show the case 140 at subsequent stages of manufacture.

In the example shown in FIGS. 3C and 4B, the planar body plate 140A may be bent in a set or predetermined shape. In some examples, the first side portions 142 and 143 may be bent after the planar body plate 140A is fixed in a bending machine and/or a press mold. Here, the extending portions 141b, 142b, and 143b may also be press-fitted through the bending machine and/or the press mold to then be bent.

In some examples, the planar body plate 140A may have the first side portions 142 and 143 bent in the third direction (z) that is substantially perpendicular to the rectangular bottom portion 141 and the long sides of the rectangular bottom portion 141 as the result of the bending process. For example, the first side portions 142 and 143 may be bent approximately 90 degrees from the long sides of the rectangular bottom portion 141 to then be extended. Here, the extending portions 141b, 142b, and 143b may be positioned at regions to be brought into contact with and coupled to the second side portions 144 and 145 of the case 140. In addition, the extending portions 141b, 142b, and 143b may be coplanarly positioned.

In addition, the first side portions 142 and 143 are bent from the rectangular bottom portion 141 in the third direction (z), thereby providing the rounded bent portions 142c and 143c having a set or predetermined curvature radius between the first side portions 142 and 143 and the rectangular bottom portion 141. For example, the rounded bent portions 142c and 143c may be portions press-fitted and rounded when the first side portions 142 and 143 are bent from the rectangular bottom portion 141 in the third direction (z).

In addition, when the first side portions 142 and 143 are bent, the corner portion 140x, where the rectangular bottom portion 141, the first extending portion 141b, the first side portion 142 and the second extending portion 142b are joined with one another, is also press-fitted to become a curved portion. In addition, the corner portion 140b, where the rectangular bottom portion 141, the first extending portion 141b, the first side portion 143 and the second extending portion 142b are joined with one another, is also press-fitted to become a curved portion.

The first extending portion 141b extending from the short sides of the rectangular bottom portion 141 in the third direction (z) may be upwardly extended, and the second extending portion 142b bent from one side of the first side portion 142 and the second extending portion 143b bent from one side of the other first side portion 143 may be extended in opposite directions so as to be positioned to face each other. In addition, the second extending portion 142b bent from the other side of the first side portion 142 and the second extending portion 143b bent from the other side of the other first side portion 143 may be extended so as to be positioned to face each other.

Here, the rectangular bottom portion 141, the first side portions 142 and 143, the round portions 141a, 142a, and 143a, the extending portions 141b, 142b, and 143b and the rounded bent portions 142c and 143c may be integrally manufactured by applying a pressure to the one planar body plate 140A using a bending machine and/or a press mold.

The second side portions 144 and 145 may be provided as separate metal plates, unlike the planar body plate 140A incorporating the rectangular bottom portion 141 and the first side portions 142 and 143. The second side portions 144 and 145 may be rectangular sheet-shaped metal plates. Here, the second side portions 144 and 145 may have the same (e.g., substantially the same) thickness and material as the planar body plate 140A and may be provided by blanking metal plates preprocessed in the same (e.g., substantially the same) manner as the planar body plate 140A. For example, the planar body plate 140A including the rectangular bottom portion 141 and the first side portions 142 and 143, and the second side portions 144 and 145 may be provided by performing the blanking process on a single preprocessed metal plate.

Figure 3D:
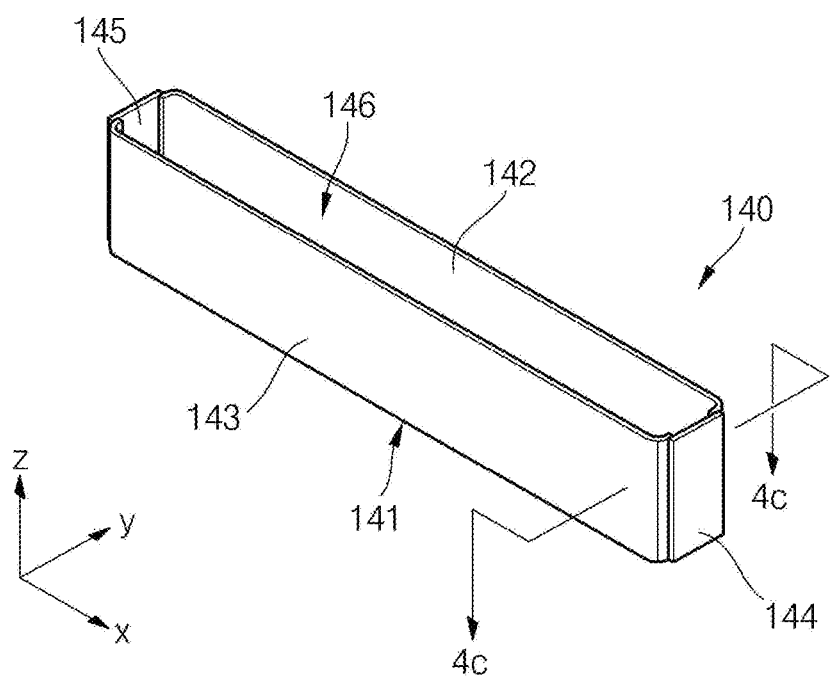
Figure 4C:
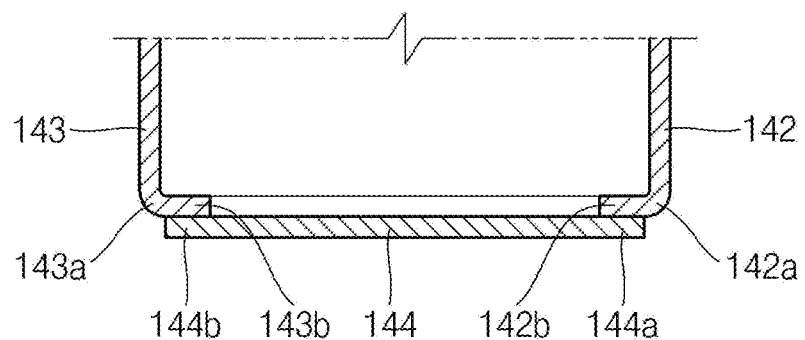

FIGS. 3D and 4C show the case 140 at subsequent stages of manufacture.

In the example shown in FIGS. 3D and 4C, the second side portions 144 and 145 may be coupled to the extending portions 141b, 142b, and 143b in a state in which edges of the second side portions 144 and 145 are in contact with the extending portions 141b, 142b, and 143b. For example, one side of the second side portion 144 may be coupled to the extending portions 141b, 142b, and 143b in a state in which an interior surface of its edge portion 144a is brought into contact with the first extending portion 141b and the second extending portions 142b and 143b. Here, opposite edge portions 144a and 144b of the one side of the second side portion 144 may be brought contact with the second extending portions 142b and 143b, respectively, and bottom edge portion 144c (see FIGS. 2A and 2B) may be brought contact with the first extending portion 141b. For example, on the one side of the second side portion 144, the edge portions 144a, 144b, and 144c may be lapped (e.g., overlapped) with the first extending portion 141b and the second extending portions 142b and 143b.

The one side of the second side portion 144 may be coupled to the extending portions 141b, 142b, and 143b by welding the edge portions 144a, 144b, and 144c of the three sides in contact with the extending portions 141b, 142b, and 143b to the extending portions 141b, 142b, and 143b. For example, the one side of the second side portion 144 may be coupled to the extending portions 141b, 142b, and 143b by lap-joint welding the three-side edge portions 144a, 144b, and 144c lapped (e.g., overlapped) or superposed with the extending portions 141b, 142b, and 143b to the extending portions 141b, 142b, and 143b.

For example, a laser beam may be supplied to contact regions between the edge portions 144a, 144b, and 144c of the one side of the second side portion 144 and the extending portions 141b, 142b, and 143b to melt the contact regions, thereby welding the contact regions. The welding process may be performed on the one side of the edge portion 144a of the one side of the second side portion 144, the bottom edge portion 144c and the other side of the edge portion 144b in that order, or vice versa. In some examples, welding may be performed on the entire (e.g., substantially the entire) contact regions between the one side of the second side portion 144 and the extending portions 141b, 142b, and 143b, as indicated by the solid lines. As the result of the welding process, the one side of the second side portion 144 may be protruded in the first direction (x), which is an exterior direction of the case 140, relative to the extending portions 141b, 142b, and 143b.

In addition, the other-side second side portions 145 may be positioned on a surface facing the one-side second side portion 144. Like the one side of the second side portion 144, the one side of the second side portion 145 may be coupled to the extending portions 141b, 142b, and 143b in a state in which its edge portions are joined with the extending portions 141b, 142b, and 143b. The one side of the second side portion 145 and the extending portions 141b, 142b, and 143b may be welded to each other in the same (e.g., substantially the same) manner in which the one-side second side portion 144 and the extending portions 141b, 142b, and 143b are coupled (welded) to each other. As described herein above, the second side portions 144 and 145 are coupled to the extending portions 141b, 142b, and 143b, respectively, thereby manufacturing the case 140 having a hexahedral shape having a top opening 146.

As described herein above, because the case 140 is manufactured such that regions where four faces, e.g., the rectangular bottom portion 141, the one side of the first side portion 141b, the one side of the first side portion 142 and the second extending portion 142b, are joined with one another, and rounded corner portions 140x and 140b, where the rectangular bottom portion 141, the first extending portion 141b, the one side of the first side portion 143 and the second extending portion 142b, are joined with one another, are press-fitted, a welding failure can be prevented from occurring to the regions where multiple (three or more) faces are joined with one another (or a likelihood or degree of such welding failure can be reduced). In addition, because the case 140 is manufactured by press-fitting only regions where the corner portions 140x and 140b are located, there is no (or substantially no) thickness deviation, and the case 140 having a small thickness may be manufactured with high accuracy. In addition, because the second side portions 144 and 145 provided as separate metal plates are welded to a body plate on a plane, the secondary battery can prevent a welding failure from occurring by welding of the curved portions (or can reduce a likelihood or degree of such welding failure).

Figure 6:
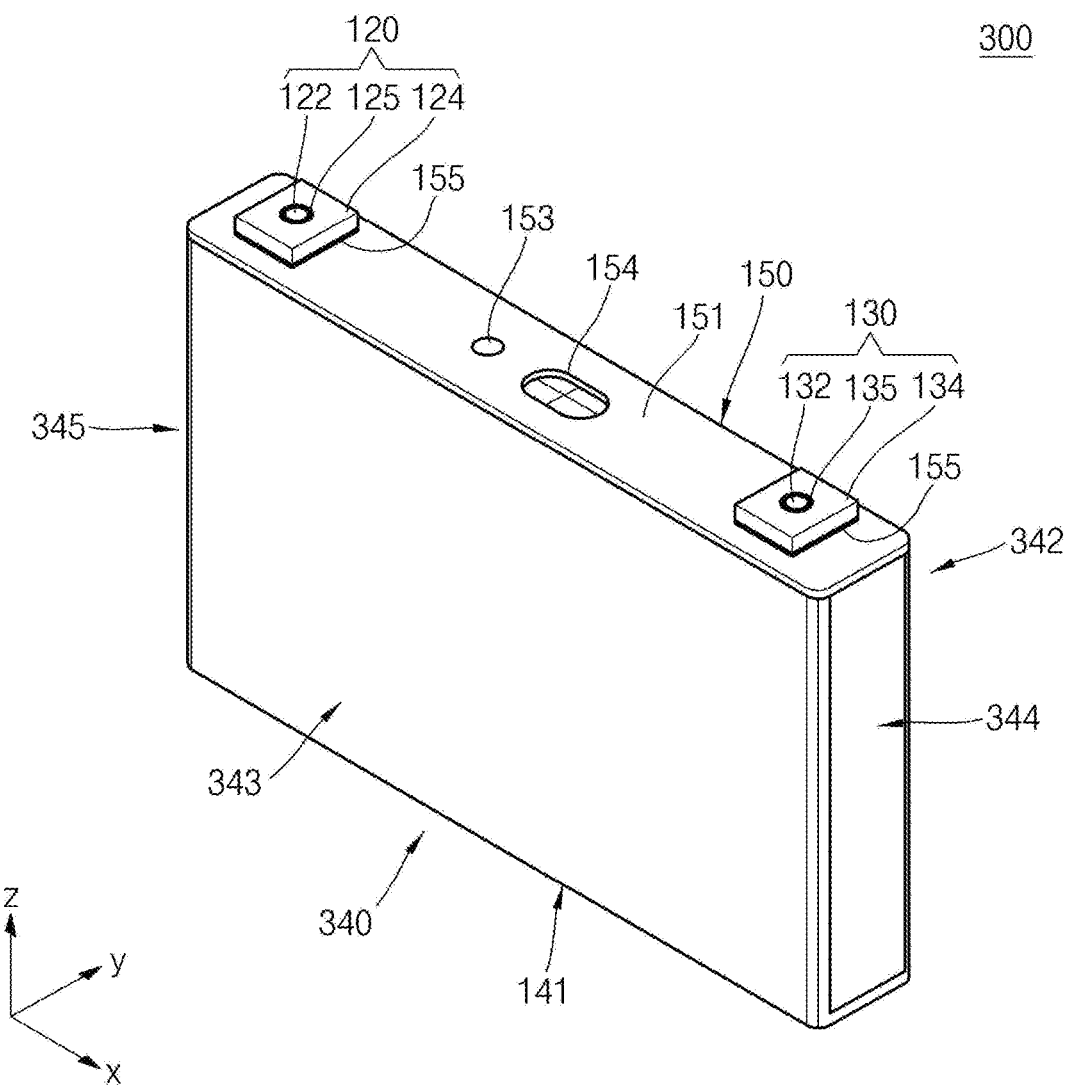
FIG. 6 is a perspective view illustrating an example secondary battery according to an embodiment of the present disclosure.

FIG. 6 is a perspective view illustrating an example secondary battery according to an embodiment of the present disclosure.

In the example shown in FIG. 6, the secondary battery 300 may include an electrode assembly (corresponding to 110 and 210 as shown in FIGS. 2A and 2B, respectively), a first terminal 120, a second terminal 130, a case 340 and a cap assembly 150. The electrode assembly of the secondary battery 300, the first terminal 120, the second terminal 130, and the cap assembly 150 are the same as those of the secondary battery 100 shown in FIG. 1. In addition, the configurations and manufacturing methods of a rectangular bottom portion 141 and first side portions 142 and 143 of the case 340 of the secondary battery 300 are substantially the same as those of the secondary battery 100 and the secondary battery 200 as shown in FIGS. 2A and 2B and FIGS. 3A to 3C, respectively.

Therefore, the following description will focus on the manufacturing method and configuration of the case 340, which are different from the secondary battery 100.

Figure 7A:
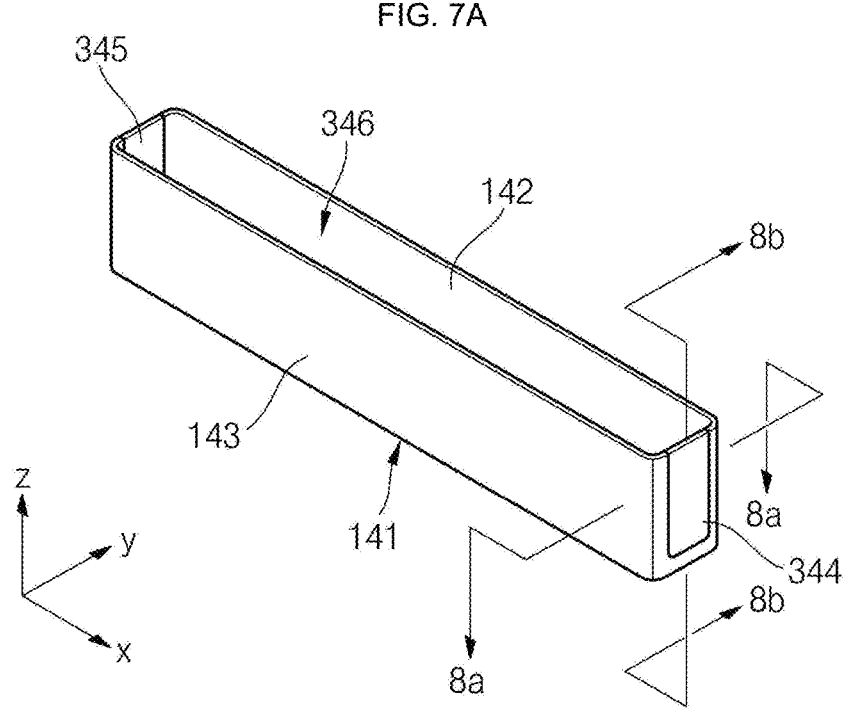
FIGS. 7A and 7B are a perspective view and a partially enlarged view illustrating an example method for manufacturing the example secondary battery shown in FIG. 6.
Figure 7B:
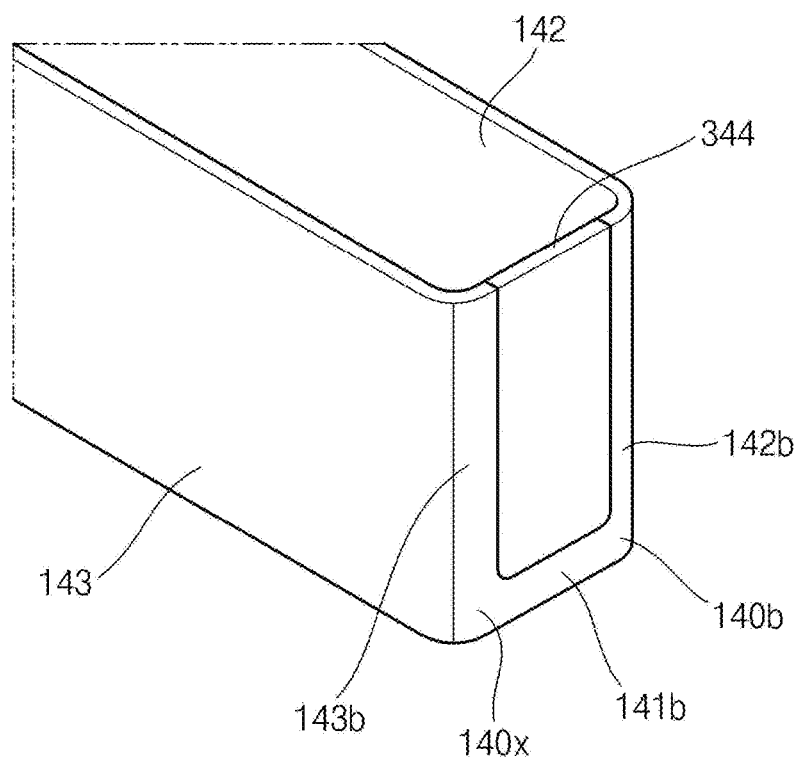

FIGS. 7A and 7B are a perspective view and a partially enlarged view, respectively, illustrating an example method for manufacturing the example secondary battery shown in FIG. 6.

Figure 8A:
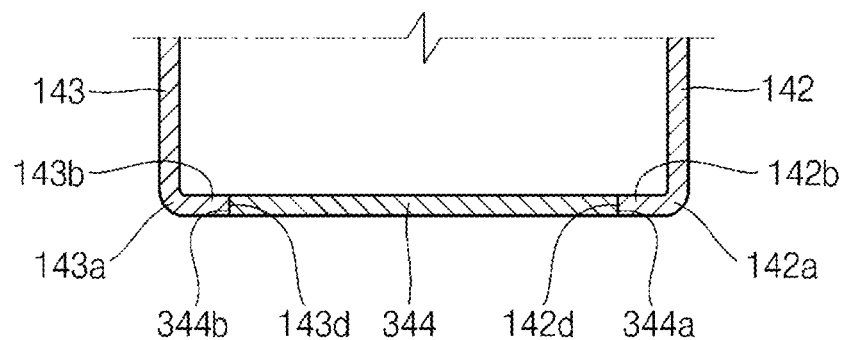
FIGS. 8A and 8B are cross-sectional views taken along the lines 8a-8a and 8b-8b of FIG. 7A, respectively.
Figure 8B:
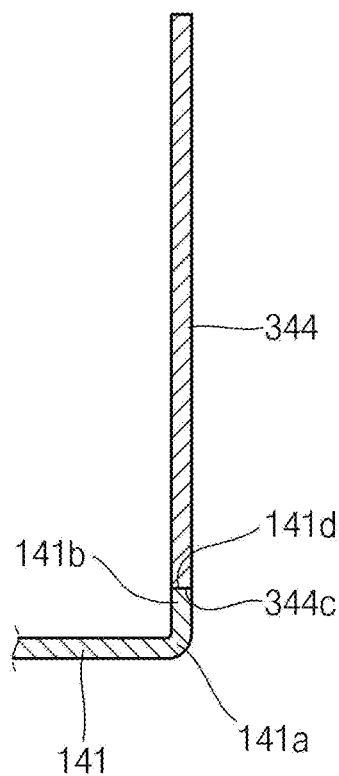

FIGS. 7A and 7B show the case 340 of the secondary battery at a subsequent stage of the manufacture. Initial stages for manufacturing the case 340 may be the same (e.g., substantially the same) as those for manufacturing the case 140 shown in FIGS. 3A to 3C. FIG. 8A is a cross-sectional top view illustrating the example secondary battery shown in FIG. 7A, taken along the lines 8a-8a of FIG. 7A, and FIG. 8B is a cross-sectional view illustrating the example secondary battery shown in FIG. 7A, taken along the lines 8b-8b of FIG. 7A. The manufacturing method and configuration of the case 340 will now be described in more detail with reference to FIGS. 7A, 7B, 8A and 8B.

In the example shown in FIGS. 7A, 7B, 8A and 8B, the second side portions 344 and 345 may be welded to extending portions 141b, 142b, and 143b in a state in which peripheral edges of the second side portions 344 and 345 are brought into contact with those of the extending portions 141b, 142b, and 143b so as to face each other. For example, the second side portions 344 and 345 and the extending portions 141b, 142b, and 143b may be coupled to each other by welding in a butted state in which their peripheral edges are matched to be brought into contact with each other. For example, one side of the second side portion 344 may be coupled to the extending portions 141b, 142b, and 143b by butt-welding in a state in which peripheral edges (e.g., opposite ends) 344a and 344b and a bottom end 344c of the one-side second side portion 344 are butted with peripheral edges (e.g., opposite ends) 141d, 142d, and 143d of the first extending portion 141b and the second extending portions 142b and 143b. In more detail, a laser beam may be supplied to contact regions between the three sides 344a, 344b, and 344c of the one-side second side portion 344 and the peripheral edges (e.g., opposite ends) 141d, 142d, and 143d of the extending portions 141b, 142b, and 143b, so that the contact regions are melted and then coupled to each other by welding. Such a welding process may be performed on the one side of the second side portion 344 from one side of the peripheral edge 344a to the bottom end 344c and to the one side of the peripheral edge 344b in that order, or the welding process may be performed in the reverse order. In some examples, welding between the one-side of the second side portion 344 and the extending portions 141b, 142b, and 143b may be performed on the entire (e.g., substantially the entire) contact regions, as indicated by solid lines. The one side of the second side portion 344 may be positioned to be coplanar with the extending portions 141b, 142b, and 143b in the second direction (y).

In addition, one side of the second side portion 345 may be positioned on a plane facing the one side of the second side portion 344. Like the one side of the second side portion 344, one side of the second side portion 345 may be coupled to the extending portions 141b, 142b, and 143b in a state in which peripheral edges of the one side of the second side portion 345 are butted with those of the extending portions 141b, 142b, and 143b. Here, the one side second side portion 345 and the extending portions 141b, 142b, and 143b may be coupled to each other by butt welding in the same (e.g., substantially the same) manner in which the one side of the second side portion 344 and the extending portions 141b, 142b, and 143b are coupled (welded) to each other. As described herein above, the second side portions 344 and 345 are coupled to the extending portions 141b, 142b, and 143b, respectively, thereby manufacturing the case 340 having a hexahedral shape having a top opening 346.

As described herein above, because the case 340 is manufactured such that regions where four faces, e.g., the rectangular bottom portion 141, the one-side first side portion 141b, the one-side first side portion 142 and the second extending portion 142b, are joined with one another, and rounded corner portions 140x and 140b, where the rectangular bottom portion 141, the first extending portion 141b, the other-side first side portion 143 and the second extending portion 142b, are butted with one another, are press-fitted, a welding failure can be prevented from occurring to the regions where multiple (three or more) faces are coupled (welded) to one another (or a likelihood or degree of such welding failure can be reduced). In addition, because the case 340 is manufactured by press-fitting only regions where the corner portions 140x and 140b are located, there is no (or substantially no) thickness deviation in the case, and the case 340 having a small thickness may be manufactured with high accuracy. In addition, because the second side portions 344 and 345 provided as separate metal plates are welded to the planar body plate 140A on a plane, a welding failure, which may occur when welding is performed on a curved portion, can be prevented (or a likelihood or degree of such welding failure can be reduced).

As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the secondary battery of the present disclosure has been particularly shown and described with reference to exemplary embodiments thereof, it will be understood by those of ordinary skill in the art that various changes in form and details may be made therein without departing from the spirit and scope of the present disclosure as defined by the appended claims, and equivalents thereof.

What is claimed is:

1. A secondary battery comprising:
an electrode assembly;
a case accommodating the electrode assembly; and
a cap assembly coupled to the case to seal the case,
wherein the case comprises:
a body plate including a bottom portion, first side portions bent and extended from the bottom portion in opposite directions, and extending portions bent from at least one selected from the bottom portion and the first side portions to then be extended; and
second side portions coupled to the extending portions,
wherein the extending portions comprise a first extending portion bent and extended away from the bottom portion such that an end of the first extending portion is not in a same plane as the entire bottom portion.

2. The secondary battery of claim 1, wherein the extending portions further comprise a second extending portion bent and extended from the first side portions.

3. The secondary battery of claim 2, wherein the body plate further comprises round portions having a set curvature radius between the bottom portion and the first extending portion and between the first side portions and the second extending portion.

4. The secondary battery of claim 3, wherein an extended length of the first extending portion or the second extending portion is either at least equal to or not greater than 2.5 times the curvature radius of each of the round portions.

5. The secondary battery of claim 1, wherein the body plate further comprises rounded bent portions between the bottom portion and the first side portion.

6. The secondary battery of claim 2, wherein the body plate further comprises rounded corner portions, where the bottom portion, the first side portions, the first extending portion and the second extending portion are joined with one another.

7. The secondary battery of claim 2, wherein the second side portions made of sheet-shaped metal plates are coupled to the first and second extending portions of the body plate in a state in which their edge portions are lapped with the first and second extending portions.

8. The secondary battery of claim 2, wherein the second side portion is outwardly protruded from the case relative to the first and second extending portions in a first direction, which is an exterior direction of the case.

9. The secondary battery of claim 2, wherein the second side portion made of a sheet-shaped metal plate is coupled to the body plate in a state in which its peripheral edge is brought into contact with the peripheral edges of the first and second extending portions of the body plate.

10. The secondary battery of claim 9, wherein the second side portion is positioned to be coplanar with the first and second extending portions in a second direction.

11. The secondary battery of claim 2, wherein the second side portion and the first extending portion, and the second side portion and the second extending portion, are coupled to one another by lap-joint welding or butt-joint welding.

12. A case for accommodating a secondary battery, the case comprising:
 a body plate including a bottom portion, first side portions bent and extended from the bottom portion in opposite directions, and extending portions bent from at least one selected from the bottom portion and the first side portions to then be extended; and
 second side portions coupled to the extending portions,
 wherein the extending portions comprise a first extending portion bent and extended away from the bottom portion such that an end of the first extending portion is not in a same plane as the entire bottom portion.

13. The case of claim 12, wherein the extending portions further comprise a second extending portion bent and extended from the first side portions.

14. The case of claim 13, wherein the body plate further comprises round portions having a set curvature radius between the bottom portion and the first extending portion and between the first side portions and the second extending portion.

15. The case of claim 14, wherein an extended length of the first extending portion or the second extending portion is either at least equal to or not greater than 2.5 times the curvature radius of each of the round portions.

16. The case of claim 12, wherein the body plate further comprises rounded bent portions between the bottom portion and the first side portion.

17. The case of claim 13, wherein the body plate further comprises rounded corner portions, where the bottom portion, the first side portions, the first extending portion and the second extending portion are joined with one another.

18. The case of claim 13, wherein the second side portions made of sheet-shaped metal plates are coupled to the first and second extending portions of the body plate in a state in which their edge portions are lapped with the first and second extending portions.

19. The case of claim 13, wherein the second side portion is outwardly protruded from the case relative to the first and second extending portions in a first direction, which is an exterior direction of the case.

20. The case of claim 13, wherein the second side portion made of a sheet-shaped metal plate is coupled to the body plate in a state in which its peripheral edge is brought into contact with the peripheral edges of the first and second extending portions of the body plate.

* * * * *